United States Patent [19]

Nakamura et al.

[11] Patent Number: 4,627,700

[45] Date of Patent: Dec. 9, 1986

[54] FOCUS DETECTING AND INDICATING DEVICE FOR CAMERA

[75] Inventors: Kazuo Nakamura; Masao Jyojiki, both of Saitama; Harumi Aoki, Tokyo, all of Japan

[73] Assignee: Asahi Kogaku Kogyo Kabushiki Kaisha, Tokyo, Japan

[21] Appl. No.: 117,931

[22] Filed: Feb. 4, 1980

[30] Foreign Application Priority Data

Feb. 15, 1979 [JP] Japan .................................. 54-16445

[51] Int. Cl.$^4$ .............................................. G03B 3/00
[52] U.S. Cl. .................................................. 354/409
[58] Field of Search ............... 354/25, 31, 60 L, 60 E, 354/53, 195, 198, 289, 25 A, 31 F, 25 R, 25 P, 25 N, 409; 250/201, 204; 356/226; 340/352

[56] References Cited

U.S. PATENT DOCUMENTS 4,230,401  10/1980  Tokutomi et al. ................ 354/31 X Primary Examiner—William B. Perkey
Attorney, Agent, or Firm—Sughrue, Mion, Zinn, Macpeak, and Seas

[57] ABSTRACT

A camera including an electronic focus detecting device and an optical display device for indicating whether the photographing lens of the camera is at a rear focus position, a front focus position or a correct focus position and for indicating whether the lens is being moved in the correct direction towards the position of correct focus. First and second photoelectric conversion element arrays are disposed in front of and behind a position which is optically equivalent to the position of the film surface in the camera. Signals are produced from the respective outputs of the arrays which are in proportion to the degree of focus than existing. A different signal is produced as well and the three signals are then processed to determine the indicated positions in a disclosed circuit arrangement.

6 Claims, 5 Drawing Figures

FOCUS DETECTING AND INDICATING DEVICE FOR CAMERA

BACKGROUND OF THE INVENTION

The present invention relates to a focus detecting and indicating device for a camera which electrically indicates not only front focus, rear focus and correct focus but also the direction in which the photographing lens should be extended for correct focus.

A variety of methods have been proposed utilizing the principle in which the image of an object to be photographed is divided into two parts and in which the two parts coincide with each other when the photographing lens is correctly focused on the object hereinafter referred to as "focalization" when applicable. Furthermore, a variety of devices in which photoelectric conversion elements are disposed before and after a position equivalent to the position of the surface of a film in order to detect front focus, rear focus and correct focus have been provided in the art.

An automatic focus detecting device has been provided as a focus detecting mechanism in which the photographing lens is moved to the position of focalization by an electric motor. In addition, recently a focus detecting and indicating device has been proposed in which the photographing lens is moved manually instead of with a motor with the focus detecting condition being indicated electrically.

The latter manual device is advantageous in the following points. Unlike the former completely automatic device, the latter device does not need a drive circuit such as an electric motor and therefore the assembled device is smaller in size, lighter in weight and simpler in construction. In addition, with the latter device, it is determined by the photographer himself whether the photographing lens is focused on an object. Accordingly, drawbacks attributed to exclusive use of the automatic operation in the automatic focus detecting device are eliminated as a result of which a camera having a great degree of freedom is provided. Furthermore, is goes without saying that focalization can be sensed more readily than with an optical focus detecting technique because focalization detection is indicated by analog or digital data.

However, a focus detecting and indicating device which displays focalization only when the photographing lens is focused on the object suffers from a problem in that the photographer cannot determine in what direction the photographing lens should be moved in order for the lens to be focused on the object. Thus, the device is still inconvenient.

Accordingly, an object of this invention is to provide a focus detecting and indicating device for a camera in which it is determined and indicated whether or not the photographer is moving the photographing lens in the correct direction while front focus and rear focus are also indicated.

SUMMARY OF THE INVENTION

This, as well as other objects of the invention, may be met by a camera device including an electric focus detecting device in which two photoelectric conversion elements are arranged in front of and behind a position which is optically equivalent to the film position in the camera. The device includes a focus detecting and indicating module including a first circuit for determining a front focus condition and a rear focus condition from the signs of a calculation output and correct focus from focalization range setting outputs, a first circuit for determining whether or not a photographing lens is moving in a correct direction to a focalization position wherein the determination is made from logical products of the signs of the calculation outputs and from the presence of an increase in the calculation outputs. A display device is provided for displaying the results determined by the second circuit.

DESCRIPTION OF THE PREFERRED EMBODIMENTS

Figure 1:
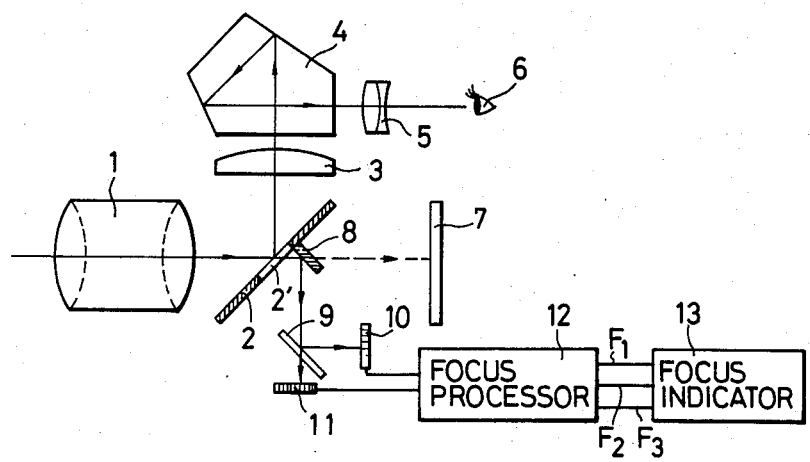
FIG. 1 is an explanatory diagram showing the arrangement of a single-lens reflex camera with an electrical focus detecting device to which the technical concept of this invention can be effectively applied.

A preferred embodiment of the invention will be described with reference to the accompanying drawings. Shown in FIG. 1 is an arrangement of a single-lens reflex camera with an electrical focus detecting device to which the technical concept of the invention can be effectively applied.

Light from an object to be photographed passes through a photographing lens 1 and is reflected by a total reflection mirror 2 as a result of which the image of the object is formed on a focusing plane below a condenser lens 3. The image is optically observed through a penta-prism 4 and a magnifier 5 by a photographer's eye 6. Also, the image is projected through a total reflection mirror 8 and a half-silvered mirror 9 onto groups of photoelectric conversion elements 10 and 11. The position of the group of photoelectric conversion elements 10 is slightly in front of a position equivalent to the position of a film surface 7 while the position of the group of photoelectric conversion elements 11 is slightly behind a position equivalent to the position of the film surface 7 while the distances of the groups 10 and 11 from the respective positions are equal to each other. The photoelectric elements of the groups 10 and 11 have the same photoelectric characteristics and have uniform light receiving surfaces.

In a focus detecting and processing circuit 12, the following calculations are carried out:

$$F_1 = \sum_{m=1}^{n-1} |i_m - i_{m+1}|, F_2 = \sum_{m=1}^{n-1} |I_m - I_{m+1}|,$$

and $F_3 = F_1 - F_2$, where $i_1, i_2, \ldots$ and $i_n$ and $I_1, I_2, \ldots$ and $I_n$ are the outputs of the photoelectric conversion elements $d_1, d_2, \ldots$ and $d_n$ of the group 10 and the outputs of the photoelectric conversion elements $D_1, D_2, \ldots$ and $D_n$ of the group 11 with respect to incident light, respectively, and n is the number of the photoelectric conversion elements in each group.

The values $F_1$ and $F_2$ thus calculated represent variations in contrast of the images of the object on the photoelectric conversion element groups 10 and 11, respectively. Each of the values becomes a maximum when the contrast of the image on the photoelectric conversion element group is at its highest value. The photoelectric conversion element groups 10 and 11 are optically equally spaced from the focalization position. Therefore, when the calculation outputs $F_1$ and $F_2$ become equal to each other ($F_1 = F_2$), a focalization point $a_0$ has been reached. Accordingly, the focalization point $a_0$ is determined from the output $F_3$. Variations of the outputs $F_1$ and $F_2$ and variations of the output $F_3$ with respect to lens position are as indicated in FIGS. 2 and 3, respectively.

Figure 4:
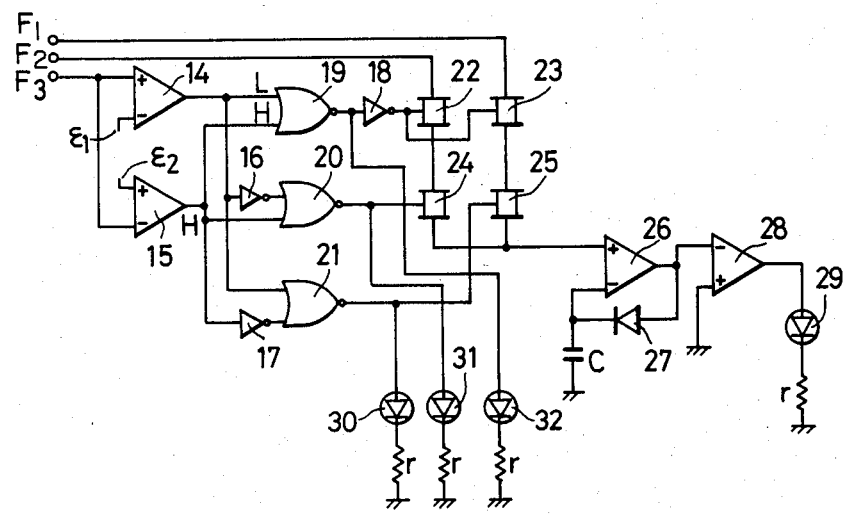
FIG. 4 is a circuit diagram, partly as a block diagram, showing an example of a focus detecting and indicating circuit according to the present invention.

The outputs $F_1$, $F_2$ and $F_3$ of the focus detecting and processing circuit 12 are applied to a focus detecting and indicating circuit 13 according to the invention where they are processed to provide an indication of the state of focalization. The focus detecting and indicating circuit 13 is constructed as shown in FIG. 4.

Figure 2:
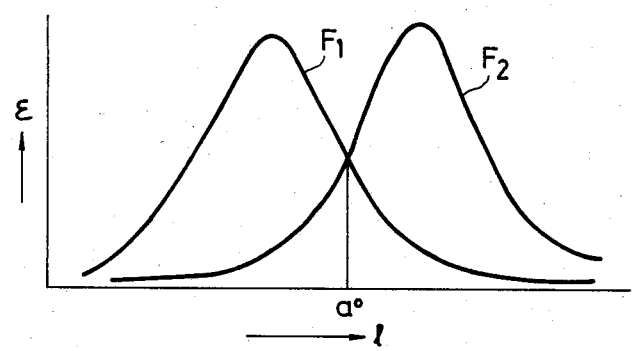
FIG. 2 is a graphical representation indicating variations of focus detection outputs with the position of a photographing lens.
Figure 3:
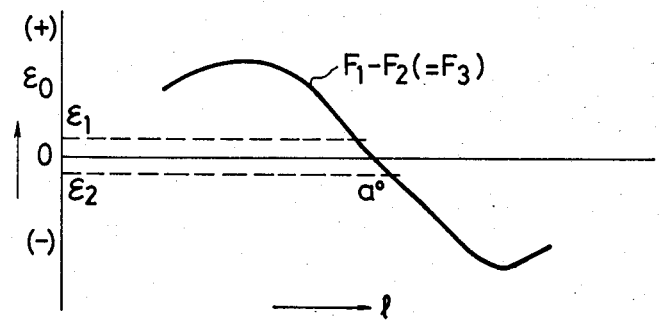
FIG. 3 is also a graphical representation indicating variations of the difference between the focus detection outputs ($F_1 - F_2 = F_3$) in FIG. 2.

FIG. 2 indicates variations of the calculation outputs $F_1$ and $F_2$ with respect to the lens position, namely the distance l of extension of the photographing lens 1. As is clear from FIG. 2, the image of an object projected onto the photoelectric conversion element group 10 becomes a maximum in contrast, that is, the calculation output $F_1$ becomes a maximum at a position not far from the film surface 7 while the output $F_1$ decreases in front of and behind the position. On the other hand, the image of the object projected onto the photoelectric conversion element group 11 becomes a maximum in contrast, that is, the calculation output $F_2$ becomes a maximum at a position near the film surface 7 while the output $F_2$ decreases in front of and behind the position. Thus, the focalization point $a_0$ mentioned above lies between the positions where the outputs $F_1$ and $F_2$ become a maximum and, accordingly, at the focalization point the output $F_1$ is equal to the output $F_2$.

In regard to the positional relationship of the photoelectric conversion element groups 10 and 11, the position of the photoelectric conversion element group 10 is far from the position which is optically equivalent to the position of the film surface 7 with the far and near points being at respectively the left end and the right end of FIG. 2.

FIG. 3 indicates variations of the calculation output $F_3$. In FIG. 3, the horizontal axis represents the same as that of FIG. 2. However, in FIG. 3, outputs $\epsilon_0$ plotted on the vertical axis have positive and negative signs. As is clear from FIG. 3, the output is positive ($F_1 > F_2$) on the left side of the focalization point $a_0$ ($F_3 = 0$) and is negative ($F_1 < F_2$) on the right side. Front focus, correct focus and rear focus can be determined from the variations in the output $F_3$. In FIG. 3, reference characters $\epsilon_1$ and $\epsilon_2$ designate outputs for setting a focalization (correct focus) range. When the output is in this range, a focalization signal is generated.

An embodiment of the focus detecting and indicating device according to the invention which is also capable of determining whether or not the photographing lens is being moved in the correct direction by using the above-described calculation outputs $F_1$, $F_2$ and $F_3$ is shown in FIG. 4.

The calculation outputs $F_1$, $F_2$ and $F_3$ with respect to the focalization range setting outputs $\epsilon_1$ and $\epsilon_2$ for the left portion, the central portion and the right portion of the range of extension of the photographing lens in FIG. 3 will be investigated. In the left portion, $F_3 > \epsilon_1 > 0$ (positive) and $F_2$ increases in the direction of the focalization point. In the central portion, $\epsilon_1 \geq F_3 \geq \epsilon_2$. In the right portion, $F_3 < \epsilon_2 < 0$ (negative) and $F_1$ increases in the direction of the focalization point.

Thus, front focus, correct focus and rear focus are determinable from the signs of the calculation outputs $\epsilon_1$ and $\epsilon_2$ while it is determinable from the output $F_3$ and the directions of increase of the outputs $F_1$ and $F_2$ whether or not the photographing lens is moving in the correct direction.

In the case of $F_3 > \epsilon_1$, the output of a comparator 14 shown in FIG. 4 is set to a high logic level "H" and the output of a comparator 15 is set to a low logic level "L". Therefore, the output of an inverter 16 is set to "L" and the output of a NOR circuit 20 is raised to "H". As a result, a display element 31 such as a light emitting diode (LED) is turned on under the control of a resistor r thereby indicating rear focus. In this case, the output of a NOR circuit 19 is at "L" and this "L" output is applied through an inverter 18 to semiconductor switches 22 and 23 thereby placing the latter 22 and 23 in a conductive state. Furthermore, the output of the NOR circuit 20 is at "H" as described above and therefore a semiconductor switch 24 is also in a conductive state. Accordingly, the calculation output $F_2$ is applied to the positive input terminal of a comparator 26. This comparator 26, a diode 27 and a capacitor C form a conventional peak detecting circuit.

When the output $F_2$ applied to the positive input terminal of the comparator 26 is increasing or is unchanged, the output of the comparator 26 is proportional to the output $F_2$. However, when the output $F_2$ begins to decrease, the output of the comparator is set to a potential lower than the ground potential, that is the level "L". Accordingly, when the photographing lens 1 is moving toward the focalization position $a_0$, the calculation output $F_2$ increases and the output of a comparator 28 is at a potential lower than the ground potential with the result that a light emitting element 29, such as an LED, is not turned on. To the contrary, when the photographing lens moves in the opposite direction, the calculation output $F_2$ decreases. Therefore, the output of the comparator 26 is set to a potential lower than the ground potential and the output of the comparator 28 is raised to "H" as result of which the light emitting element 29 is momentarily turned on. Thus, it can be determined from the lighting of the light emitting element 29 whether or not the photographing lens is moving in the correct direction.

In the case where $\epsilon_1 \geq F_3 \geq \epsilon_2$, that is, the case of correct focus, both of the outputs of the comparators 14 and 15 are set to "L" and therefore only the output of the NOR circuit 19 is raised to "H" so that a light emitting element 32 such as an LED is turned on. Since the "H" output of the NOR circuit 19 is applied through the inverter 18 to the semiconductor switches 22 and 23, the switches 22 and 23 are rendered non-conductive. Accordingly, the light emitting element 29 is not turned on irrespective of the movement of the photographing lens 1.

In the case of $F_3 < \epsilon_2$, the outputs of the comparators 14 and 15 are set to "L" and "H", respectively. The output of the comparator 15 is applied through an inverter 17 to a NOR circuit 21. Therefore, only the output of the NOR circuit 21 is raised to "H". As a result, a light emitting element 30 is turned on while a semiconductor switch 25 is rendered conductive. The output of the NOR circuit 19 is applied through the inverter 18 to the semiconductor switches 22 and 23 rendering the latter conductive. Accordingly, the calculation output $F_1$ is applied to the positive input terminal of the comparator 26. As a result, the light emitting element 29 is turned on or off as described above so that the direction of movement of the photographing lens can be determined.

Each semiconductor switch in FIG. 4 has three terminals, two terminals from which the leads extend vertically and one terminal from which the lead extends horizontally. When the terminal from which the lead extends horizontally is at an "H" level, the other two terminals are short-circuited, that is, the switch is rendered conductive.

Figure 5:
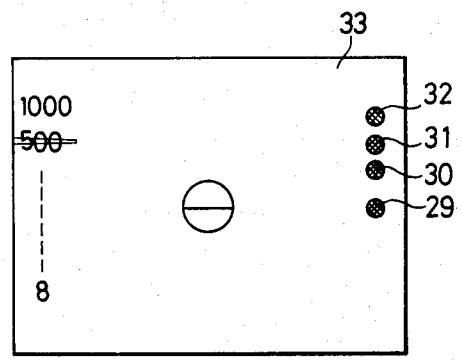
FIG. 5 is a plan view showing an example of a view finder in which a focus indicator and a movement direction deciding indicator are incorporated.

FIG. 5 shows an example of a displaying technique in a view finder 33. The light emitting element 32 is turned on when the photographing lens is in the focalization range, the light emitting element 31 is turned on for rear focus, and the light emitting element 32 is turned on for front focus, while the display element or light emitting element 29 is turned on when the photographing lens is moving in a direction opposite to the direction to the focalization position.

Thus, the focus detecting and indicating device according to the invention is ideal in that it informs the photographer of not only the present focusing state, namely rear focus, correct focus or front focus, but also the necessary direction of movement of the photographing lens.

It goes without saying that an automatic focus detecting device can be constituted by utilizing the calculation outputs $F_1$, $F_2$ and $F_3$. In the embodiment described above, light emitting elements such as LED's are employed for display purposes. However, the display may be carried out as well utilizing liquid crystals or a generating device which produces different sounds.

What is claimed is:

1. In a camera of the type having a photographing lens which may be at an in-focus position, front-focus position or rear-focus position, an electrical focus detecting and indicating device of the type including means for generating a first focus detection signal (F1) having a maximum value at a front focus position of said lens, a second focus detection signal (F2) having a maximum value at a rear-focus position of said lens and a third focus-detection signal (F3) having a higher value on one side of said in-focus position than on the other side of said in-focus position, said electrical focus detecting and indicating device further comprising:

a first circuit (14–21) responsive to said third focus detection signal for providing output signals indicating the front, rear or in-focus position of said lens;

a second circuit (22–28) responsive to said first circuit output signals and to said first and second signals for providing an output signal indicating whether or not said photographing lens is moving in a direction toward said in-focus position; and a display circuit (29) responsive to said second circuit output signal for displaying to a camera operator whether or not the photographic lens is presently moving toward said in-focus position.

2. A camera including an electrical focus detecting device comprising: first and second arrays of photoelectric conversion elements; first circuit means (12) coupled to receive outputs of said first and second photoelectric conversion elements for producing first, second and third signals wherein said first and second signals respectively correspond to sums of differences between adjacent elements within said first and second arrays and said third signal represents a difference between said first and second signals; and second circuit means (13) operating in response to said first, second and third signals for providing to an operator of said camera information as to whether a photographing lens of said camera is at a rear focus position, a front focus position or a correct focus position and also providing information as to whether the lens is presently being moved toward said correct focus position.

3. The camera device of claim 2 wherein said second circuit means operating in response to said first, second and third signals comprises: first and second comparator means receiving said third signal, said third signal being coupled to a positive comparison input of said first comparator and a negative comparison input of said second comparator, a negative comparison input of said first comparator being coupled to a first reference voltage and a positive comparison input of said second comparator being coupled to a source of a second reference voltage; logic circuit means coupled to outputs of said first and second comparators; and first, second and third display lamp means coupled to outputs of said logic circuit means for providing indications of whether said photographing lens is at a rear focus position, a front focus position or a correct focus position.

4. The camera device of claim 3 wherein said logic circuit means comprises: a first NOR gate having one input coupled to said output of said first comparator and a second input coupled to said output of said second comparator; first and second inverters having inputs coupled respectively to said output of said first comparator and said output of said second comparator; a second NOR gate having an input coupled to an output of said first inverter and an input coupled to said output of said second comparator; and a third NOR gate having an input coupled to said output of said first comparator and an input coupled to an output of said second inverter.

5. The camera device of claim 4 wherein said display means comprises first, second and third LED's, said first, second and third LED's each having an input coupled to a respective one of said first, second and third NOR gates.

6. The camera device of either of claims 4 or 5 said second circuit means comprising:

a third inverter having an input coupled to said output of said first NOR gate; first through fourth electronic switch means (22–25), each of said electronic switch means having first and second switch terminals and an input control terminal, said first (22) and second (23) electronic switch means having control terminals coupled to an output of said third inverter (18), said first and second electronic switch means having first switch terminals coupled to receive said first and second signals, respectively, said third electronic switch means (24) having a control input terminal coupled to said output of said second NOR gate, said fourth electronic switch means (25) having a control input terminal coupled to said output of said third NOR gate (21), said third and fourth electronic switch means having first switch terminals coupled, respectively, to second switch terminals of said first and second electronic switch means;

a third comparator having a positive comparison input coupled to second switch terminals of both said third and fourth electronic switch means and a negative comparison input coupled through a capacitor to a ground terminal and a diode connected between an output of said third comparator and said negative comparison input; a fourth comparator having a negative comparison input coupled to said output of said third comparator and having a positive comparison input coupled to said ground; and a display lamp coupled to an output of said fourth comparator, said display lamp indicating whether said photographing lens is moving toward said correct focus position.

* * * * *